United States Patent [19]

Grimm et al.

[11] 4,079,362
[45] Mar. 14, 1978

[54] PIEZO-ELECTRIC SEED-FLOW MONITOR

[75] Inventors: Edward A. Grimm; Garry E. Paulson, both of Saskatoon, Canada

[73] Assignee: Canadian Patents and Development Limited, Ottawa, Canada

[21] Appl. No.: 702,059

[22] Filed: Jul. 2, 1976

[51] Int. Cl.² .............................................. G08B 21/00
[52] U.S. Cl. .................................... 340/259; 310/321; 340/261; 340/267 R
[58] Field of Search ................... 340/259, 261, 267 R; 310/9.1, 8.1, 326, 321

[56] References Cited

U.S. PATENT DOCUMENTS

| | | | |
|---|---|---|---|
| 2,875,352 | 2/1959 | Orlacchio | 310/9.1 |
| 3,015,977 | 1/1962 | Stegink et al. | 340/261 |
| 3,422,413 | 1/1969 | Mason | 340/267 R |
| 3,527,928 | 9/1970 | Ryder et al. | 340/267 R |
| 3,626,402 | 12/1971 | Price | 340/267 R |
| 3,832,704 | 8/1974 | Kardashian | 340/261 |
| 3,863,250 | 1/1975 | McCluskey, Jr. | 310/8.1 |
| 3,921,159 | 11/1975 | Steffen | 340/259 |
| 4,004,289 | 1/1977 | Kirk | 340/259 |

Primary Examiner—Glen R. Swann, III
Attorney, Agent, or Firm—Edward Rymek

[57] ABSTRACT

The monitor is used with seeder equipment having one or more seeder hopper sections wherein each hopper section has a number of metering assemblies for feeding the seed from each hopper section to the soil. The monitoring apparatus includes at least one sensor consisting of a piezoelectric transducer which provides an output signal in response to being struck by a seed, a vibration isolating mounting structure to position the sensor in the seed flow path between the metering assembly and the soil, and a circuit for receiving the sensor electronic response and providing an indication of seed flow condition. The mounting structure includes an elongated member such as a metal tubing, to one end of which is fixed a cushion made of a material such as a closed cell foam and to the other end of which is fixed a securing member to secure the structure to the seeder. The sensor is positioned on the cushion and a pair of leads connected across the sensor, pass through the tube and are connected to twin conductors at the other end. The circuit for each sensor includes a control circuit which processes the sensor signal and which provides an output control signal representing a flow condition such as the no flow condition. The circuit further includes visual and audio alarm circuits which indicate the flow condition for each sensor.

11 Claims, 5 Drawing Figures

PIEZO-ELECTRIC SEED-FLOW MONITOR

BACKGROUND OF THE INVENTION

This invention is directed to a seeder monitor and in particular to an apparatus which continuously monitors the state of seed flow in seeding equipment to indicate a malfunction to the operator.

Seeding equipment malfunctions can be caused by a variety of reasons such as a low level of the seed hopper, a loose or broken drive chain, a disengaged drive after headland turning or in loose soil, or a breakdown at any other point in the drive mechanism. Visual detection of these malfunctions by the operator, remote in the tractor cab, is extremely difficult under dusty poor visibility conditions or after dark, especially when multiple unit arrangements are being used. The result of these malfunctions going unnoticed is bare, unseeded patches in the field which are not only expensive in the form of lost productivity but are also embarassing to the farmer's professional pride.

In order to detect malfunctions, the devices presently in use either monitor the flow of seed by optical techniques or they monitor the rotation of the shaft in the seed feed mechanism. The optical techniques are particularly useful with large seed crops such as corn or beans and are found not to be suitable for small seed crops such as wheat, barley, rape and other cereal or oil grain crops due to the differences in seeder equipment construction, and seed size, seed flow rate and the possibility of dust which can cover the sensors. The shaft monitoring techniques provide useful information about the functioning of the seed feed mechanism but do not directly provide information as to the seed flow from the seeding equipment into the soil. Thus an empty seed hopper or the like could go undetected.

SUMMARY OF THE INVENTION

It is therefore an object of this invention to provide an appartus for monitoring the state of seed flow from the seeding equipment seed hopper to the soil.

It is a further object of this invention to provide a seeder monitor with sensors in direct contact with the seed flow.

It is another object of this invention to provide a seeder monitor having sensors which can be readily installed on the various models of seeder equipment.

It is a further object of this invention to provide a seeder monitor which is reliable for all types of seed and/or granular fertilizer.

These and other objects are achieved in a monitor for a seeder having one or more seed hopper sections and metering assemblies for feeding the seed from the hoppers to the soil, wherein the monitoring apparatus includes at least one sensor consisting of a piezoelectric transducer which provides an output signal in response of being struck by seed, a vibration isolating mounting structure for positioning the sensor in the seed flow path between the metering assembly and the soil, and a circuit for receiving the sensor electronic response and providing an indication of seed flow condition. The mounting structure includes an elongated member such as a metal tubing, to one end of which is fixed a cushion made of a material such as closed cell foam and to the other end of which is fixed a securing member to secure the mounting structure to the seeder. The sensor is located on the cushion, a pair of leads connected across the sensor pass through the tubing and are connected to twin conductors at the other end. The circuit for each sensor includes a control circuit which processes the sensor signal and which provides an output control signal representing a flow conditions such as the no flow condition. The circuit further includes visual and audio alarm circuits which indicate the flow condition to the operator for each sensor.

DESCRIPTION OF THE PREFERRED EMBODIMENTS

Figure 1:
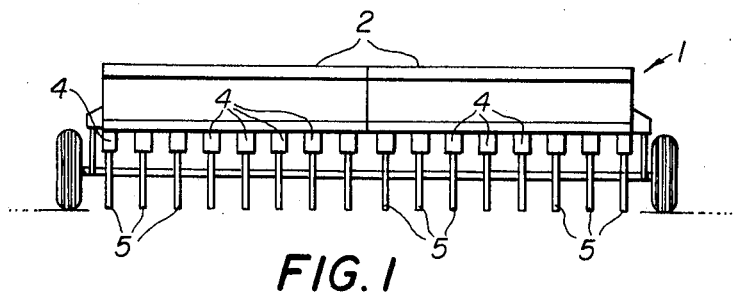
FIG. 1 is a schematic of a typical seeder.
Figure 2:
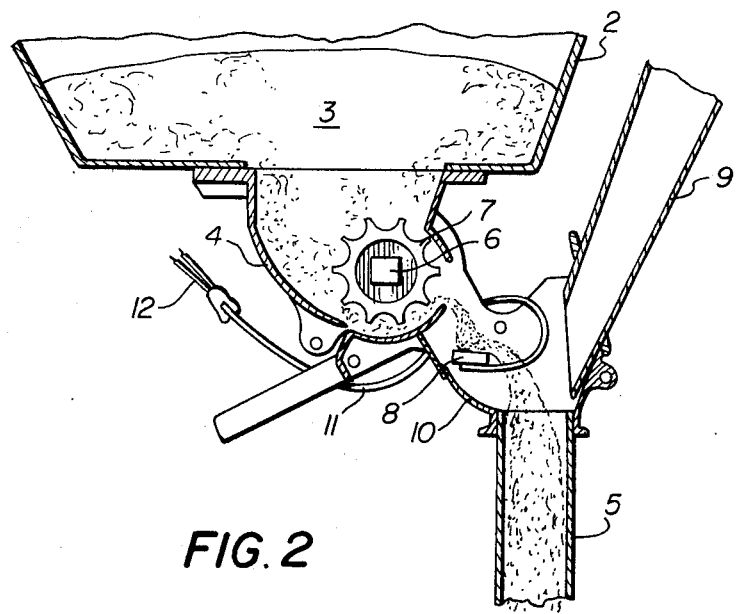
FIG. 2 illustrates a typical seed metering mechanism in a seeder.

Referring to FIG. 1, a schematic of a conventional seeder 1 is illustrated. A typical seeder includes one or more seed hopper sections 2 in which seed is stored with a number of feed mechanisms 4 positioned under each hopper. The feed mechanisms 4 are normally driven by one of the seeder wheels and control the rate of seed flow from the hopper 2 through seed tubes 5 into a furrow in the soil that is made by a furrow opening device such as a disc or a hoe. FIG. 2 shows one example of a typical feed mechanism 2. Seeding equipment may consist of one or more seeders 1, and as each seeder 1 is pulled by a tractor, a shaft 6 in the feed mechanism 4 is rotated by a chain drive from one of the seeder wheels, causing a metering wheel 7 which is fixed to the shaft 6 to discharge seed 3 from the hopper 2 at a flow rate proportional to the seeder 1 velocity. The seed 3 falls into a seed cup 10 and down through the seed tube 5.

In addition, a seeder 1 may further have a second set of hopper sections with feed mechanisms to discharge fertilizer during the seeding operation. The fertilizer may be discharged directly to the soil or into cup 10 by a fertilizer tube 9 as shown in FIG. 2.

In order to monitor the flow of seed 3, a sensor 8 is positioned in the path of the seed flow from the feed mechanism 4. Sensor 8 may be mounted in the seed cup 10 by a mounting structure 11 as shown in FIG. 2 or at some other point in the seed tube 5 between the cup 10 and the soil. The signal generated by the seed 3 falling on the sensor 8 is fed via conductors 12 to control and indicating circuits.

A separate sensor 8 may be mounted in each of the seed cups 10 of a seeder 1 to monitor the flow of seed to each furrow during the seeding operation, however it has been found that due to the shaking motion of the seeder 1 as it is pulled across a field, the seed 3 tends to form a mound in the hopper section 2 and thus the feeder mechanisms 4 at each end of the hopper 2 run out of seed first. Therefore, it can be seen that satisfactory monitoring results may be achieved by using only one sensor 8 in each hopper section 2 if it is placed in one of the end cups 10.

Figure 3:
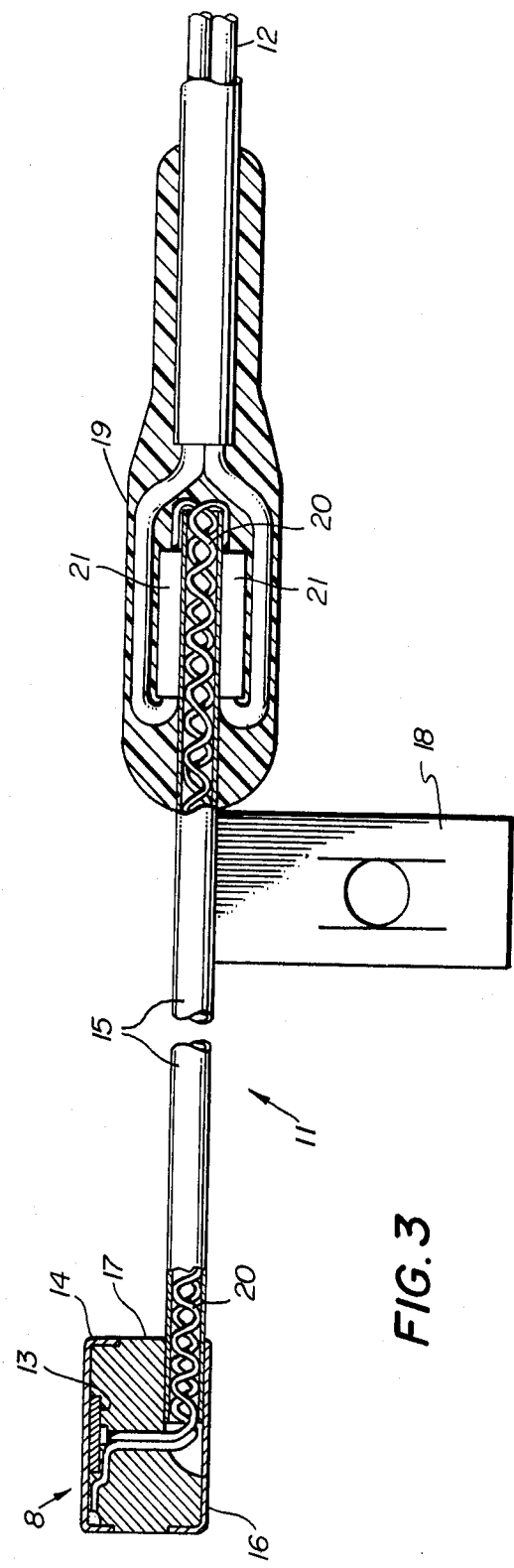
FIG. 3 illustrates one embodiment of a seed sensor used with the present invention.

Referring to FIG. 3, one embodiment of a sensor 8 and mounting structure 11 is illustrated. The sensor 8 consists of an impact sensitive transducer 13 fixed to a cup shaped or flat disc 14 which may have a diameter in the order of 2 cm. and may be made of brass, aluminum or other metal. A pair of leads 20 are connected across the transducer 13 to pick up the signals generated by the transducer 13 as individual seeds strike the disc 14. Though transducer 13 need not resonate at a particular frequency, a piezoelectric crystal which has a specific resonant frequency may be used in sensor 8, the resonant frequency of which will be governed by the size and shape of the crystal 13 and disc 14. If a resonant frequency crystal 13 is used, it is preferred that the resonant frequency of sensor 8 be greater than 16 khz so as to be above the frequencies which could be generated at low levels by vibrations in the seeder equipment.

The mounting structure consists of a tube 15, again made of aluminum, brass or other metal through which the leads 20 may pass, with a second disc 16 fixed to the one end of tube 15. The sensor 8 is mounted on the mounting structure disc 16 by means of a cushion 17 such as closed cell foam rubber to isolate the vibrations of the mounting structure 11 from the sensor 8. A perforated tab 18 or the like is fixed to the other end of tube 15 by which the mounting structure 11 may be secured to the cup 10 or other location on the seeder equipment. Finally the mounting structure 11 includes a sealed connector 19 in which the leads 20 are connected to twin conductors 12 by means of shrink tubing 21. The conductors 12 may be shielded to prevent induced signals of the conductors 12, however need not be so as will be described with respect to FIGS. 4 and 5.

Figure 4:
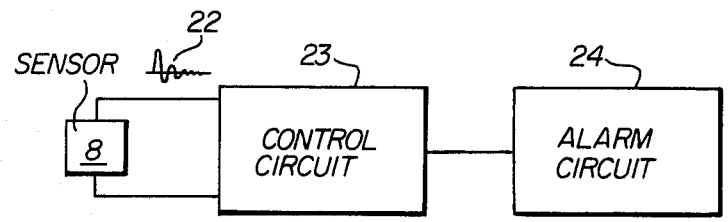
FIG. 4 is a block diagram of the seeder monitor in accordance with the present invention.
Figure 5:
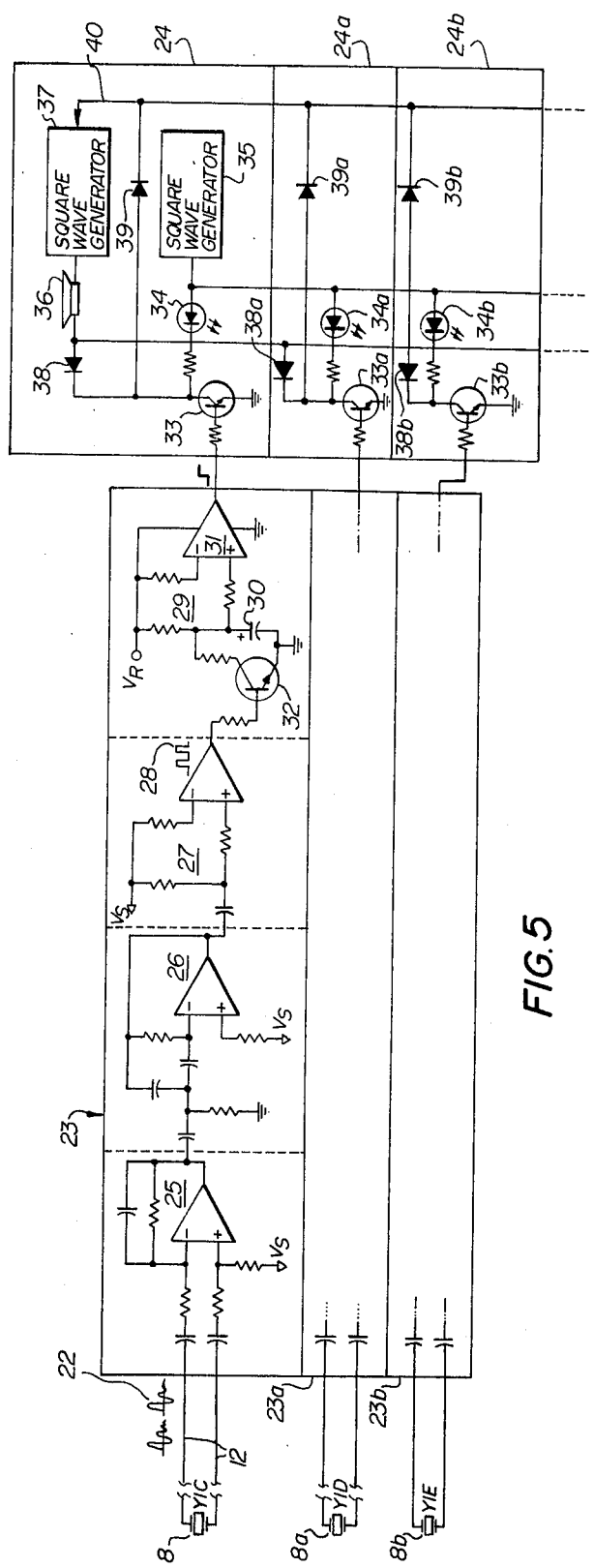
FIG. 5 illustrates one embodiment of the circuit diagram of the seeder monitor in accordance with the present invention.

In the preferred embodiment of the seeder monitor in accordance with the present invention, as shown schematically in FIG. 4 and in detail in FIG. 5, the seeder monitor includes a sensor 8 which produces a signal 22 for each seed striking the sensor 8. This signal is fed via twin conductors 12 to a control circuit 23 which processes the signal 22. The output of control circuit 23 is fed to a display or alarm circuit 24 which provides a visual and/or audio alarm signal to the operator of the seeder equipment to indicate the seed flow condition sensed by the sensor 8. The visual and audio alarm circuit 24 is preferably mounted on the tractor near the operator, however the control circuit 23 may be mounted on the seeder equipment near the sensor 8 or with the alarm circuit 24 on the tractor.

In the embodiment of the monitor circuit in FIG. 5, the signal 22 from sensor 8 is fed to the two inputs of a differential amplifier 25. As amplifier 25 is connected across the sensor 8, any spurious signals induced on lines 12 will be eliminated. Amplifier 25 may further have bandpass characteristics so as to respond primarily to the frequency of the signal 22. Thus if the resonant frequency of the sensor 8 is in the order of 19 to 20 khz, the bandwidth of the bandpass characteristics of amplifier 25 should be in the order of 16 to 23 khz. The output signal from the differential amplifier 25 is coupled to a high pass amplifier 26 to amplify the sensor signal and further eliminate low frequency noise. The output signal from amplifier 26 is coupled to a threshold circuit 27, which provides pulse output signals 28 in response to input signals having a predetermined set amplitude. Thus, the output 28 of threshold circuit 27 consists of a pulse for each seed which strikes the sensor 8 with sufficient impact.

The output signal 28 from the threshold detector 27 is coupled to a charging circuit 29. Charging circuit 29 consists of a capacitor 30 which is charged by a reference source $V_r$ through a resistor, and an amplifier 31 arranged to provide an output signal i.e. goes high when a predetermined voltage appears across the capacitor 30. In addition, a transistor circuit 32 having its input coupled to the threshold circuit 27 is connected across capacitor 30 such that the transistor 32 is fired by each of the pulse signals 28 to discharge the capacitor 30. Thus, if seed flows onto the sensor 8 at a predetermined rate, the output of the charging circuit 29 will remain zero or low. The time constant for charging circuit 29 may be set such that if the seed ceases to flow for approximately ½ second, capacitor 30 charges sufficiently to fire amplifier 31.

In the present embodiment, the alarm circuit 24 consists of a transistor switch 33 which is controlled by the output of amplifier 31 to fire when amplifier 31 is high, connected in series with a lamp 34, such as a light emitting diode and a square wave generator 35. Thus when transistor 33 is fired, sufficient current will periodically flow through lamp 34 to cause it to flash on and off, warning the operator that seed flow has ceased. In addition, the alarm circuit may include an audible alarm 36 such as a buzzer connected in series between a square wave generator 37 and the transistor 33. The square wave generator 37 would preferrably have a longer period than the period of square wave generator 35, i.e. 2 seconds on and 8 seconds off, such that the buzzer would sound every ten seconds during continuous no seed flow condition.

In a monitoring system having two or more sensors, i.e. sensors 8, 8a, 8b, ..., each sensor may have identical control and alarm circuits to circuits 23 and 24 described above. However as shown in FIG. 5, the alarm circuits may be intercoupled to eliminate the need to duplicate some of the components such as the square wave generators 35 and 37 and audio alarm 36. Each sensor 8, 8a, 8b, ..., has a control circuit 23, 23a, 23b, ..., respectively, and an alarm circuit 24, 24a, 24b, ..., respectively. Each alarm circuit 24, 24a, 24b, ..., includes a transistor switch 33, 33a, 33b, ..., with an isolating diode 38, 38a, 38b, ... connecting the audio alarm 36 and the collectors of transistors 33, 33a, 33b, ..., respectively. The square wave generator 35 is connected to each of the lamps 34, 34a, 34b, ..., which are shown as light emitting diodes and therefore do not need further isolating diodes. In addition, each alarm circuit 24, 24a, 24b, ..., may include a second diode 39, 39a, 39b, ..., with the anode coupled to the transistor 33, 33a, 33b, ..., collector and the cathodes coupled together. These diodes 39, 39a, 39b, ..., provide a voltage on line 40 when at least one of the transistors 33, 33a, 33b, ..., is not conducting, this voltage may be used to control square wave generator 37 such that it is disabled when all of the transistors 33, 33a, 33b, ..., are conducting. Thus when the operator stops the seeder equipment and seed flow ceases at all of the sensors, the audio alarm is automatically disabled, however the light-emitting diode for each sensor continues to flash.

Though the monitor has been described with respect to the monitoring of seed flow during seeding operation, if a seeder is equipped to simultaneously fertilize the soil, one or more of the sensors in the monitor may also be positioned in the paths of fertilizer flow to monitor the flow of fertilizer to the soil.

We claim:

1. Monitoring apparatus for seeder equipment having one or more seed hopper sections and a number of metering assemblies for feeding the seed from each hopper to the soil, comprising:

one or more sensor means, each of said sensor means including a piezo-electric crystal fixed to a metal disc for providing an electronic output signal when the disc is struck by seed;

mounting means for each of said sensor means to mount the sensor means in the path of seed flow between a metering assembly and the soil, said mounting means including an elongated member having securing means fixed to one end for securing the mounting means to the seeder and cushion means fixed to the other end of the elongated member on which the sensor means is fixed thereby isolating the sensor means for spurious vibrations of the seeder and electrically insulating the sensor means from the mounting means; and circuit means coupled to the sensor means for receiving the electronic signals and for indicating a predetermined seed flow condition.

2. Monitoring apparatus as claimed in claim 1 wherein the cushion means consists of a closed cell foam.

3. Monitoring apparatus as claimed in claim 2 wherein the elongated member consists of a metal tubing having a pair of leads therein, the leads being connected to said sensor means at said other end of said member and to a pair of conductors at said one end of said member.

4. Monitoring apparatus as claimed in claim 3 wherein said circuit means includes:

control circuit means coupled to said pair of conductors from each sensor means to receive the sensor means output signal and to provide an output control signal representing a predetermined seed flow condition; and alarm circuit means coupled to said control circuit means to receive the output control signal and to provide a visual alarm signal indicating the predetermined seed flow condition.

5. Monitoring apparatus as claimed in claim 4 wherein the control circuit means includes:

differential amplifier means having a bandpass characteristic centered at the predetermined resonant frequency of the sensor means for amplifying the signal difference across the sensor means;

threshold detector means coupled to the amplifier means for providing output pulses in response to amplified sensor signals exceeding a predetermined amplitude; and charging circuit means having a charging capacitor connected to a reference source to charge said capacitor, amplifier means coupled to said capacitor to provide an output control signal in response to a predetermined voltage across said capacitor, and switch means connected across said capacitor to discharge said capacitor in response to pulses from said threshold detector.

6. A monitoring apparatus as claimed in claim 5 wherein said alarm circuit means includes a normally open alarm switch means connected in series with lamp means and a voltage source, said alarm switch means being coupled to the amplifier means of said charging circuit to close in response to said output control signal thereby illuminating said lamp means to indicate a no flow condition.

7. A monitoring apparatus as claimed in claim 6 wherein said alarm circuit further includes audible alarm means and a second voltage source in series with said alarm switch means to activate the audible alarm means in response to said output control signal.

8. A monitoring apparatus as claimed in claim 7 wherein the first-recited and second voltage sources consist of square wave voltage generators.

9. A monitoring apparatus as claimed in claim 7 wherein the second voltage source includes means for deactivating the second voltage in response to a no flow condition on all of the sensor means.

10. Monitoring apparatus as claimed in claim 3 wherein the sensor means has a resonant frequency above 16 kHz.

11. Monitoring apparatus for seeder equipment having one or more seed hopper sections and metering assemblies for feeding the seed from the hoppers to the soil comprising:

one or more sensor means having an impact sensitive transducer mounted on a metal disc for providing an electronic output signal when the disc is struck by seed;

means for mounting the sensor means between the metering assembly and the soil in the path of seed flow;

control circuit means coupled to each sensor means to receive the sensor means output signal and to provide an output control signal representing a predetermined seed flow condition, said control circuit means including differential amplifier means having a bandpass characteristic centered at the predetermined resonant frequency of the sensor means for amplifying the signal difference across the sensor means, threshold detector means coupled to the amplifier means for providing output pulses in response to amplified sensor signals exceeding a predetermined amplitude, and charging circuit means having a charging capacitor connected to a reference source to charge said capacitor, amplifier means coupled to said capacitor to provide an output control signal in response to a predetermined voltage across said capacitor, and switch means connected across said capacitor to discharge said capacitor in response to pulses from said threshold detector; and alarm circuit means including a normally open alarm switch means connected in series with lamp means and a first voltage source, said alarm switch means being coupled to the amplifier means of said charging circuit means to close in response to said output control signal thereby illuminating said lamp means to indicate a no flow condition, audible alarm means and a second voltage source in series with said alarm switch means to activate the audible alarm means in response to said output control signal, wherein said second voltage source includes means for deactivating the second voltage source in response to a no flow condition on all of the sensor means.

* * * * *